(12) United States Patent
Goslin

(10) Patent No.: US 10,635,665 B2
(45) Date of Patent: Apr. 28, 2020

(54) SYSTEMS AND METHODS TO FACILITATE BI-DIRECTIONAL ARTIFICIAL INTELLIGENCE COMMUNICATIONS

(71) Applicant: Disney Enterprises, Inc., Burbank, CA (US)

(72) Inventor: Michael P. Goslin, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 83 days.

(21) Appl. No.: 15/850,005

(22) Filed: Dec. 21, 2017

(65) Prior Publication Data

US 2019/0197126 A1    Jun. 27, 2019

(51) Int. Cl.
| | | |
|---|---|---|
| *G06F 16/30* | (2019.01) | |
| *G06F 16/2452* | (2019.01) | |
| *G06N 5/02* | (2006.01) | |
| *G10L 15/18* | (2013.01) | |
| *G10L 25/63* | (2013.01) | |
| *G10L 15/22* | (2006.01) | |

(52) U.S. Cl.
CPC ....... *G06F 16/24522* (2019.01); *G06N 5/022* (2013.01); *G10L 15/1815* (2013.01); *G10L 15/22* (2013.01); *G10L 25/63* (2013.01); *G10L 2015/223* (2013.01)

(58) Field of Classification Search
CPC .............. G06F 16/24522; G06N 5/022; G10L 15/1815; G10L 25/63
USPC .................................................. 707/600–899
See application file for complete search history.

(56) References Cited

U.S. PATENT DOCUMENTS

2019/0138095 A1*  5/2019  Visser ................... G06F 3/0346

\* cited by examiner

*Primary Examiner* — Isaac M Woo
(74) *Attorney, Agent, or Firm* — Esplin & Associates, PC

(57) ABSTRACT

This disclosure presents systems and methods to facilitate artificial intelligence communications. One or more sensors may be configured to generate output signals conveying user behavior information and/or other information. The user behavior information may represent one or more communicative behaviors of a user in a real world. The one or more communicative behaviors may be interpreted based on communication structures of the one or more communicative behaviors to determine a meaning of a message conveyed by the one or more communicative behaviors. The communication structures may be categorized by structure type. The structure types may include one or more of a verbal type communication structure and/or a non-verbal type communication structure. Verbal type communication structure may refer to the conveyance of words via speech and/or non-speech communications. Non-verbal communication structure may refer to the conveyance of one or more of feelings, emotions, and/or impressions.

22 Claims, 3 Drawing Sheets

SYSTEMS AND METHODS TO FACILITATE BI-DIRECTIONAL ARTIFICIAL INTELLIGENCE COMMUNICATIONS

FIELD

This disclosure relates to systems and methods to provide bi-directional artificial intelligence communications.

BACKGROUND

Current virtual assistants (e.g., Siri, Watson, Alexa, etc.) may be designed to be intelligent, but not necessarily entertaining. These systems provide verbal answers/responses for questions the user poses to the assistant. These systems focus on text (or speech-to-text conversion) and/or speech processing to interact with a user.

SUMMARY

One or more aspects of the disclosure relate to providing bi-directional artificial intelligence communications. Speech captures only a small subset of human communications. Much of what is communicated between humans is non-verbal and/or non-speech, such as facial expressions, physical gestures, tone/inflection of voice, and/or other nonverbal communications. These elements may be brought into the communication with intelligent assistants (or characters) to make the experience more realistic.

The communications received from a user may be interpreted to determine meanings of messages conveyed by those communications. The interpretation may be based on determining structure of communicative behaviors of the user in the real world and/or other information. The structure may include one or a combination of a verbal type communication structure and/or a non-verbal type communication structure. The verbal type communication structure may refer to the conveyance of words. Both speech and non-speech behaviors may convey words. The non-verbal type communication structure may refer to the conveyance of one or more of feelings, impressions, and/or emotions other than specific words themselves. By interpreting user communications with consideration of one or more of verbal type communication structure, non-verbal type communication structure, and/or other information, meaning may be derived from the communicative behaviors that may go beyond meaning gleaned from spoken words alone.

The communications to a user may be provided through a virtual, or real, character and/or assistant. For example, a virtual assistant may provide communications through a speaker and/or on a screen as an animated character. A real character may be in the form of a robot and/or other real objects. The communications may be designed to entertain and/or inform the user. In some implementations, the communications may be focused on entertainment and/or user engagement, such that the factual accuracy that conventional virtual assistants provide may or may not be implemented. For example, the assistant may respond to non-speech communicative behaviors and/or other behaviors of the user.

A system configured to facilitate bi-directional communication may utilize various inputs, sensors, and/or other information to capture nonverbal and/or verbal elements of user communication. The sensors may include a camera and/or other sensors that may record the user's facial expressions, physical gestures, other body movements, and/or other communicative behaviors. For example, it may be recognized that the user's eyebrows have furrowed, which may indicate the user is angry and/or confused. In some implementations, biometric data about the user may be captured. By way of non-limiting illustration, if the user's heart rate is higher than normal, it may be recognized that the user is stressed and/or excited. Audio detection may be configured to detect the users inflections and/or tones while speaking. For example, saying "really?" vs "really!" may mean two entirely different things.

The system configured to facilitate bi-directional nonverbal communication may include one or more of one or more computing platforms, one or more sensors, and/or other components. Individual computing platforms may include one or more physical processors and/or other components. The one or more physical processors may be configured by machine-readable instructions. The machine-readable instructions may include one or more computing program components. The computer program components may include one or more of an input component, a communication component, an interpretation component, an AI response component, and/or other components.

The input component may be configured to obtain output signals from one or more sensors. The output signals may convey user behavior information and/or other information. The user behavior information may represent one or more communicative behaviors of a user in a real world.

The communication component may be configured to determine individual communication structures of individual ones of the one or more communicative behaviors. The individual communication structures may be of an individual structure type. The structure types may include one or more of a verbal type communication structure, a non-verbal type communication structure, and/or other communication structure types.

The interpretation component may be configured to interpret the one or more communicative behaviors based on the individual communication structures of the one or more communicative behaviors to determine a meaning of a message conveyed by the one or more communicative behaviors.

The AI response component may be configured to determine a responsive communication that is responsive to a determined meaning of a message conveyed by one or more communicative behaviors.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
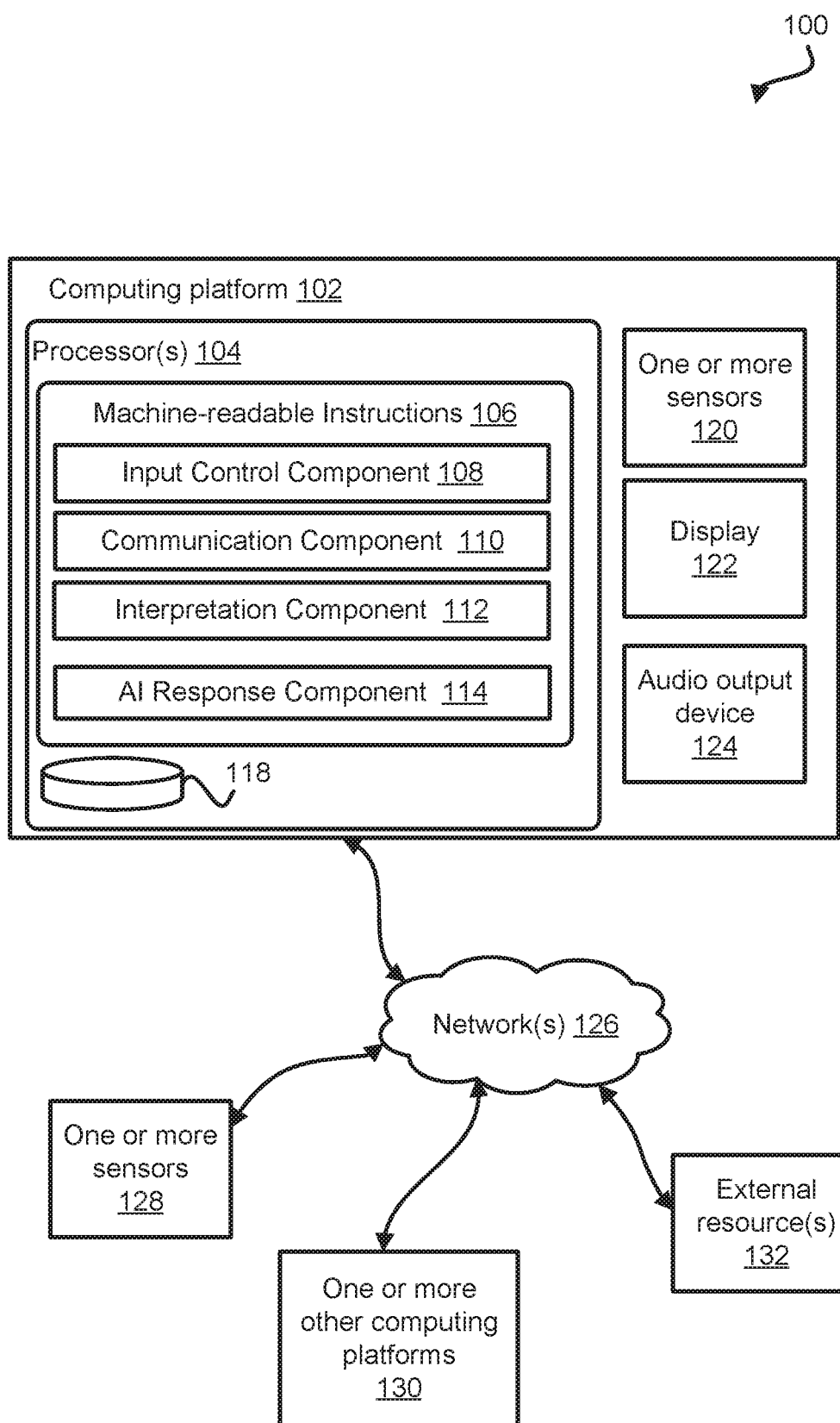
FIG. 1 illustrates a system configured to facilitate bi-directional artificial intelligence communication, in accordance with one or more implementations.

FIG. 1 illustrates a system 100 configured to facilitate bi-directional artificial intelligence communication, in accordance with one or more implementations. In some implementations, communications received from a user may be interpreted to determine meanings of messages conveyed by those communications. The interpretation may be based on determining structure of communicative behaviors of the user in the real world and/or other information. The structure may include one or a combination of a verbal type communication structure and/or a non-verbal type communication structure. The verbal type communication structure may refer to the conveyance of words. Both speech and non-speech behaviors may convey words. The non-verbal type communication structure may refer to the conveyance of one or more of feelings, impressions, and/or emotions other than specific words themselves. By interpreting user communications with consideration of one or more of verbal type communication structure, non-verbal type communication structure, and/or other information, meaning may be derived from messages conveyed by communicative behaviors of a user that may go beyond meaning of spoken words alone.

In some implementations, communications to a user may be provided through a virtual, or real, assistant. For example, a virtual assistant may provide communications through a speaker and/or on a screen as an animated character. A real assistant may be in the form of a robot and/or other real objects. The communications may be designed to entertain and/or inform the user. In some implementations, the communications may be focused on entertainment and/or user engagement, such that the factual accuracy that conventional virtual assistants provide may or may not be implemented. The communications to a user in the form of an animated character may incorporate both verbal and non-verbal type communication structure. Accordingly, the responses provided to user communications may also go beyond solely speech-based communications.

The system 100 may include one or more of a computing platform 102, one or more other computing platforms 130, one or more sensors 128, one or more external resources 132, and/or other components. It is noted that while some descriptions herein may be directed to computing platform 102, this is for illustrative purposes only and is not to be considered limiting. For example, it is to be understood that individual ones of one or more other computing platforms 130 may be configured in the same or similar manner as computing platform 102.

The computing platform 102 may include one or more of one or more physical processors 104, one or more sensors 120, a display 122, an audio output device 124, and/or other components. The one or more physical processors 104, one or more sensors 120, a display 122, an audio output device 124, and/or other components may comprise part of and/or otherwise be included in computing platform 102. The computing platform 102 may include one or more of a mobile computing platform (e.g., one or more of a cellular telephone, a smartphone, a laptop, a tablet computer, an AR/VR platform, and/or other computing platforms), a stationary computing platform (e.g., a desktop computer, gaming console, and/or other computing platforms), and/or other computing platforms.

In some implementations, display 122 may be configured to present visual content. Visual content may be in the form of images, video, text, and/or other content. Presentation of images, video, text, and/or other content via display 122 may be facilitated by control signals communicated to display 122. The display 122 may include one or more of screen, a set of screens, a touchscreen, a monitor, and/or other displays.

The one or more sensors 120 of computing platform 102 may be configured to generate output signals conveying user behavior information and/or other information. The user behavior information may represent one or more communicative behaviors of a user in a real world. The communicative behaviors may include one or more of a communication of a sound, a communication of a movement, a communication of a biological marker, and/or other behaviors. A communication of a sound may be associated with communication of one or more of words, combinations of words, tones, and/or other sounds. A communication of movement may be associated with voluntary and/or involuntary gestures performed by one or more body parts of a user. A communication of a biological marker may be in response to some stimuli. In some implementations, a communication of a biological marker may be an involuntary communication.

The one or more sensors 120 may include one or more of a depth sensor, an image sensor, one or more biometric sensors, an audio input sensor, inertial measurement unit/sensor (IMU), and/or other sensors.

A depth sensor may be configured to generate output signals conveying depth information and/or other information. Depth information may include distance and/or range of real-world surfaces and/or objects from the depth sensor, and/or other information. In some implementations, depth information may be provided in the form of a point cloud. A point cloud may include a set of points. Individual points may represent individual points on surfaces within the real world. The depth information may specify, for individual points, one or more of an individual distance of the point from the depth sensor, an individual orientation of the point with respect to the depth sensor, and/or other information. In some implementations, shape of an object, orientation of a surface and/or object, and/or other information may be determined from depth information. In some implementations, a depth sensor may comprise one or more of a time-of-flight sensor, a structured light sensor, an unstructured light sensor, an active stereo pair, a passive stereo pair, and/or other depth sensing devices. A user may perform movements within a field of view of a depth sensor. The movements may be recognized from the depth information and/or used to determine gestures and/or other information.

An image sensor may be configured to generate output signals conveying visual information and/or other information. Visual information may define visual content within a field of view of the image sensor. The visual content may include depictions of real-world objects and/or surfaces present in the real world. For example, the visual content may include depictions of a user and/or other objects present in the real-world. For example, a user may hold an object, such as a sign, and the sign and/or words/graphics on the sign may be recognized. In some implementations, the visual information may specify visual content in the form of pixels in an image. Pixels may be defined by one or more of location (e.g., two-dimensional coordinate on an image plane), color, transparency, and/or other information. In some implementations, an image sensor may comprise one or more of a photosensor array (e.g., an array of photosites), a charge-coupled device sensor, an active pixel sensor, a complementary metal-oxide semiconductor sensor, an N-type metal-oxide-semiconductor sensor, and/or other image sensors. A user may perform movements within a field of view of the image sensor. The movements may be recognized from the visual information and/or used to determine gestures and/or other information using image-based approaches.

A biometric sensor may be configured to generate output signals conveying biometric information and/or other information. The biometric information may include biometric readings of the user. The biometric readings of a user may be used to identify communications of biological markers. A biometric sensor may include one or more of a temperature sensor, a heartrate monitor, an eye tracker, blood pressure sensor, Galvanic skin response monitor, EEG sensor, EMG sensor, and/or other sensors. A temperature sensor may be configured to generate output signals conveying biometric information including one or more of skin temperature readings, internal body temperature readings, and/or other readings. A heartrate monitor may be configured to generate output signals conveying biometric information including heartrate. An eye tracker may be configured to generate output signals conveying biometric information including one or more of gaze direction, pupil dilation, and/or other readings. A blood pressure sensor may be configured to generate output signals conveying biometric information including blood pressure readings. A Galvanic skin response monitor may be configured to generate output signals conveying biometric information including measurements of electrical resistance of the skin. An EEG sensor may be configured to generate output signals conveying biometric information including measurements of brain electrical activity. An EMG sensor may be configured to generate output signals conveying biometric information including measurements of electrical activity produced by skeletal muscles.

An audio input sensor may be configured to generate output signals conveying audio information and/or other information. The audio information may define audio content captured by the audio input sensor. The audio content may include one or more of utterances from a user, environmental sound, and/or other content. An audio input sensor may including a sound transducer or other sensor configured to convert sound (e.g., air pressure variation) into an electrical signal. By way of non-limiting illustration, an audio input sensor may include a microphone.

An inertial measurement unit/sensor (IMU) may be configured to generate output signals conveying specific forces on a body coupled to the IMU. By way of non-limiting illustration, an inertial measurement unit may be configured to detect linear acceleration using one or more accelerometers, rotational rate using one or more gyroscopes, and/or other information.

The one or more sensors 128 may include the same or similar sensors as one or more sensors 120 included in computing platform 102. The output from individual sensors of one or more sensors 128 may be provided to computing platform 102 via network(s) 126. Individual sensors of one or more sensors 128 may be included in one or more devices external to computing platform 102. The individual sensors of one or more sensors 128 may be arranged and/or may be configured to be arranged relative computing platform 102 and/or a user of computing platform 102 in a manner which facilitates generation of output signals for the purpose of gathering information about a user. For example, an image sensor of computing platform 102 may be configured to capture a certain field of view of the real world, which may depict only a portion of a user. An image sensor of one or more sensors 128 may be included in an external device that may be arranged to capture a different field of view in order to obtain depictions of another portion of the user.

The audio output device 124 may be configured to provide audio output. The audio output may be in accordance with communications from an AI assistant. By way of non-limiting illustration, audio output device 124 may include a speaker.

The one or more physical processors 104 may be configured by machine-readable instructions 106. Executing machine-readable instructions 106 may cause one or more physical processors 104 to facilitate bi-directional artificial intelligence (AI) communications. The machine-readable instructions 106 may include one or more computer program components. The one or more computer program components may include one or more of an input component 108, a communication component 110, an interpretation component 112, an artificial intelligence response component 114 (abbreviated "AI Response Component" in FIG. 1), and/or other components.

The input component 102 may be configured to obtain output signals from one or more sensors 120 and/or 128. The output signals may convey user behavior information and/or other information. The user behavior information may include one or more of visual information, depth information, audio information, biometric information, and/or other information. The visual information may define visual content including depictions of a user and/or other objects present in the real world. The depth information may define a point cloud including depictions of a user and/or other objects present in the real world. The audio information may define audio content including utterances from a user and/or other sounds. The biometric information may include one or more biometric readings of a user.

The communication component 110 may be configured to identify individual communicative behaviors based on output signals from one or more sensors 120 and/or 128. By way of non-limiting illustration, an individual communicative behavior may be defined as one or more of a communication of a sound, a communication of a movement, a communication of a biological marker, and/or other behaviors. A communication of sound may be identified based on user behavior information including audio information defining audio content including utterances from a user and/or other sounds. A communication of movement may be identified based on user behavior information including visual information defining visual content including depictions of a user and/or other objects. A communication of movement may be identified based on user behavior information including depth information defining a point cloud including depictions of a user and/or other objects. A communication of a biological marker may be identified based user behavior information including biometric information including biometric readings of the user.

The communication component 110 may be configured to determine individual communication structures of individual ones of the one or more identified communicative behaviors. The communication structures may be categorized into structure type. The structure types may include one or more of verbal type communication structure, non-verbal type communication structure, and/or other structure type. The verbal type communication structure may refer to the conveyance of words. Both speech based and non-speech based behaviors may convey words. The non-verbal type communication structure may refer to the conveyance of one or more of feelings, impressions, and/or emotions other than specific words themselves.

In some implementations, communication structures may include one or more of a word, a tone, a gesture, a physiological response, and/or other structures.

A word may refer to a communication that conveys a single distinct meaning. A combination of words forming a sentence may convey one or more meanings. Words may inherently be of the verbal type communication structure. Words may be conveyed by communications of sound and/or movement. For example, saying the word "yes" conveys the meaning of that word, e.g., affirmation. Giving a "thumbs up" also conveys the word "yes" and/or the meaning of affirmation.

A tones may refer to a vocal sound of one or more audio qualities. The audio qualities may include one or more of pitch, vibration, volume, inflection, and/or qualities. Tones may be conveyed by communication of sounds. A tone may be of one or both of the verbal type communication structure and/or the non-verbal type communication structure. For example, in some implementations a tone may be of the verbal type communication structure by conveying a particular word with or without actual words being spoken. For example, a tone changing from a low to high pitch may convey the word "yes" and/or a meaning of affirmation. In some implementations, a tone may be of the non-verbal type communication structure by conveying one or more of feelings, impressions, and/or emotions other than specific words themselves. For example, a tone that starts at a high volume and ends at a low volume convey a feeling of disappointment.

A gesture may refer to a series of movements of one or more body parts of a user. A gesture may be of one or both of the verbal type communication structure and/or the non-verbal type communication structure. In some implementations a gesture may be of the verbal type communication structure by conveying a particular word with or without actual words being spoken. For example, a gesture of giving a "thumbs up" may convey the word "yes" and/or a meaning of affirmation. In some implementations, a gesture may be of the non-verbal type communication structure by conveying one or more of feelings, impressions, and/or emotions other than specific words themselves. For example, a gesture of throwing your hands up in the air may convey a feeling of frustration.

A physiological response may refer to an involuntary communication based on some stimuli. The stimuli may be tactical, audible, visible, and/or other stimuli. A physiological response may be of the non-verbal type communication structure. In some implementations, a physiological response may be of the non-verbal type communication structure by conveying one or more of feelings, impressions, and/or emotions other than specific words themselves. For example, a physiological response of blushing may convey a feeling of embarrassment.

For a communicative behavior comprising a communication of sound, communication component 110 may be configured such that the communication of the sound may be determined as one or more of a word of a verbal type communication structure, a tone of the verbal type communication structure, a tone of the non-verbal type communication structure, and/or other structures.

For a communicative behavior comprising a communication of the movement, communication component 110 may be configured such that the communication of the movement may be determined as one or more of a gesture of the verbal type communication structure, a gesture of the non-verbal type communication structure, and/or other structures of other types.

For a communicative behavior comprising a communication of a biological marker, communication component 110 may be configured such that the communication of the biological marker may be determined as a physiological response of the non-verbal type communication structure.

The interpretation component 112 may be configured to interpret one or more communicative behaviors to determine a meaning of a message conveyed by the one or more communicative behaviors. The one or more communicative behaviors may be interpreted based on one or more of individual meanings of individual communicative behaviors, communication structures of the one or more communicative behaviors, a combination of communicative behaviors, association information, and/or other information. The association information may specify one or more of associations between individual communicative behaviors and individual meanings of messages, associations between combinations of communicative behaviors and individual meanings of messages, and/or other associations. In some implementations, association information may be stored in non-transitory electronic storage 118 of computing platform 102 and/or other storage location.

As presented herein, spoken words may only a small subset of human communications. Much of what is communicated between humans is non-verbal and/or non-speech, such as facial expressions, other physical gestures, tone of voice, and/or other non-speech communications. These communicative behaviors, when communicated alone or in combination with other communicative behaviors, may cause a meaning of a message conveyed by a user to go beyond merely the spoken words. The association information may be used to specify how certain communicative behaviors, when communicated alone or in combination with other behaviors, may cause a meaning of a message to change beyond mere communication of spoken words. That is, spoken words absent other communicative behaviors may convey a meaning that is simply the meaning of the spoken words and/or sentences formed by the words. However, other behaviors communicated alone with spoken words may cause the meanings to change. Further, non-speech communicative behaviors may have meanings on their own.

By way of non-limiting illustration, consider a given message which may be communicated by an individual or a combination of communicative behaviors. The association information may include a first association between a communicative behavior of the verbal type communication structure and a first meaning of a message. The association information may include a second association between a combination of communicative behaviors of the verbal type communication structure and a second meaning of a message. The association information may include a third association between a communicative behavior of the non-verbal type communication structure and a third meaning of a message. The association information may include a fourth association between a combination of communicative behaviors of the non-verbal type communication structure and a fourth meaning of a message. The association information may include a fifth association between a combination including one or more communicative behaviors of the verbal type communication structure and one or more communicative behaviors of the non-verbal type communication structure, and a fifth meaning of a message.

The interpretation component 112 may be configured to interpret one or more communicative behaviors to determine a meaning of a message based on one or more of individual communication structures of the one or more communicative behaviors, association information, and/or other information.

By way of non-limiting illustration, following the above example of the first association, interpretation component 112 may be configured to determine the meaning of a message conveyed by one or more communicative behaviors is the first meaning by virtue of determining the one or more communicative behaviors is the communicative behavior of the verbal type included in the first association.

Following the above example of the second association, interpretation component 112 may be configured to determine the meaning of a message conveyed by one or more communicative behaviors is the second meaning by virtue of determining the one or more communicative behaviors is the combination of communicative behaviors of the verbal type included in the second association.

Following the above example of the third association, interpretation component 112 may be configured to determine the meaning of a message conveyed by one or more communicative behaviors is the third meaning by virtue of determining the one or more communicative behaviors are the communicative behavior of the non-verbal type included in the third association.

Following the above example of the fourth association, interpretation component 112 may be configured to determine a meaning of a message conveyed by one or more communicative behaviors is the fourth meaning by virtue of determining the one or more communicative behaviors are the combination of communicative behaviors of the non-verbal type included in the fourth association.

Following the above example of the fifth association, interpretation component 112 may be configured to determine a meaning of a message conveyed by one or more communicative behaviors is the fifth meaning by virtue of determining the one or more communicative behaviors is the combination including one or more communicative behaviors of the verbal type and one or more communicative behaviors of the non-verbal type included in the fifth association.

The above examples of associations is provided for illustrative purposely only and is not to be considered limiting. For example, it is understood that there is a wide range of human behaviors and that those behaviors, alone or in combination, may convey one or more meanings. The meanings imparted on certain behaviors or combinations of behaviors may be subjective and/or objective depending on many factors (e.g., culture, age, gender, etc.). Accordingly, the following are illustrative practical examples of association information and how communicative behaviors, alone or in combination, may convey some meaning. The examples are non-exhaustive and are meant as illustrative examples only. Those skilled in the art may appreciate variations and/or alternatives that are within the scope of the present disclosure.

By way of non-limiting illustration, the communicative behavior of the verbal type communication structure associated with the first association may include a gesture of "thumbs up." The meaning of that message may be a meaning of affirmation similar to the speaking the word "yes" and/or other meaning. Other communicative behaviors of the verbal type communication structure may include one or more of speaking of words, a gesture such as shrugging (conveying the phrase "I don't know"), a gesture of connecting the thumb and forefinger in a circle (conveying the word "okay"), a gesture of waving (conveying the word "hello"), holding a sign having words printed thereon, and/or other behaviors.

The combination of communicative behaviors of the verbal type communication structure associated with the second association may include a gesture of "thumbs up" and the spoken word "yes." The meaning of that message may be a meaning of confident affirmation and/or other meaning.

The communicative behavior of the non-verbal type communication structure of the third association may include a gesture of an "eye roll." The meaning of that message may be incredulity and/or other meaning. Other communicative behaviors of the non-verbal type communication structure may include one or more of a grunt sound (conveying the feeling of anger), a gasp sound (conveying a feeling of surprise), a physiological response of blushing (conveying the feeling of embarrassment), a gesture of extending the palm forward (conveying a feeling of disdain), a gesture of furling eyebrows (conveying a feeling of confusion), a physiological response of a darting gaze (an involuntary response when lying), a gesture of frowning (conveying a feeling of sadness), a gesture of smiling (conveying a feeling of happiness), a gesture of tapping a foot (conveying a feeling of nervousness) and/or other behaviors.

The combination of communicative behaviors of the non-verbal type communication structure of the fourth association may include a gesture of "a furled brow" and a gesture of a "head tilt." The meaning of that message may be inquisitive confusion and/or other meaning. Other combinations of communicative behaviors of the non-verbal type communication structure may include a combination of a gesture of smiling and a physiological response of blushing (conveying a feeling of nervous excitement), and/or other behaviors.

The combination of behaviors including one or more communicative behaviors of the verbal type communication structure and one or more communicative behaviors of the non-verbal type communication structure of the fifth association may include the spoken word "yes" and a gesture of an "eye roll." The meaning of that message may be sarcastic affirmation, or denial. Other combinations of behaviors including verbal type communication structure and non-verbal type communication structure may include a combination including the spoken word "yes" and a physiological response of a darting gaze (conveying apprehensive affirmation or denial), and/or other combinations.

The artificial intelligence response component 114 may be configured to determine a responsive communication that is responsive to one or more communicative behaviors of a user. In some implementations, the responsive communication may be presented using non-verbal and/or verbal type communication structures as presented herein.

In some implementations, the responsive communication may be responsive to one or more of a meaning of a message conveyed by an individual communicative behavior in a set of multiple communicative behaviors, a meaning of a message conveyed by a subset of communicative behaviors included in a set of multiple communicative behaviors, and/or a meaning of a message conveyed by a set of multiple communicative behaviors. In other words, a responsive communication may be determined to be responsive to one, some, or all of the communicative behaviors communicated by a user.

In some implementations, a responsive communication may be responsive to a meaning of a message conveyed by an individual communicative behavior in a set of multiple communicative behaviors. In some implementations, the individual communicative behavior may be a communicative behavior of a non-verbal type communication structure and/or other behavior. For example, the responsive communication may be responsive to one or more of the feelings, impressions, and/or emotions conveyed by a user and not words conveyed by other behaviors. This type of responsive communication may connect with a user on a deeper level than simply responding to speech-based communications. It may keep the user engaged while still provide a response that may be relatively simple and may not require intense speech analysis and/or query/response processing. For example, a user may pose a question to an AI assistant and/or respond to a communication from the AI assistant. The interpretation component 112 may interpret one of multiple behaviors as conveying that the user may be nervous (e.g., a voice crack, for example). The AI response component 114 may determine a responsive communication that may be responsive to the nervousness but may not be responsive to other behaviors (e.g., the words spoken by the user). The response may include, for example, "You sound nervous, maybe we can get back to this topic later." The user may feel as if the AI assistant is attentive to their communications and the user may draw more value from the experience.

In some implementations, the individual communicative behavior may be a communicative behavior of the verbal type communication structure. In particular, the communicative behavior of the verbal type communication structure may be a non-speech behavior. For example, a responsive communication may be determined that is responsive to a gesture performed by a user while the user was also speaking.

In some implementations, a responsive communication may be responsive to a meaning of a message conveyed by a subset of communicative behaviors included in a set of multiple communicative behaviors. Such communications may be responsive to meanings interpreted when a subset of multiple communicative behaviors of the user are considered as a sub-combination. For example, the subset of behaviors may be interpreted as the sub-combination as giving a particular meaning, while the remaining behaviors may not impart meaningfulness or constructiveness to the communication as a whole. For example, an assistant may pose a question to the user. The user may respond with a variety of physical gestures and spoken words. The physical gestures may include one or more of hand movements, facial feature movements, and/or other gestures. The responsive communication may be responsive to the facial feature movements and the spoken words, but not the hand movements. This may be because the hand movements may not impart constructive meaning to the user communications.

In some implementations, a responsive communication may be responsive to a meaning of a message conveyed by a set of multiple communicative behaviors. Such communications may be responsive to meanings interpreted when the set of multiple communicative behaviors of the user are considered in combination.

The artificial intelligence response component 114 may be configured to control an AI assistant to effectuate communication of responsive communications. Controlling the AI assistant may include controlling one or more of a generation of sound via audio output device 124, an animation of a character presented on display 122, movement and/or other behaviors of a real character (e.g., a robot), and/or other control.

Figure 3:
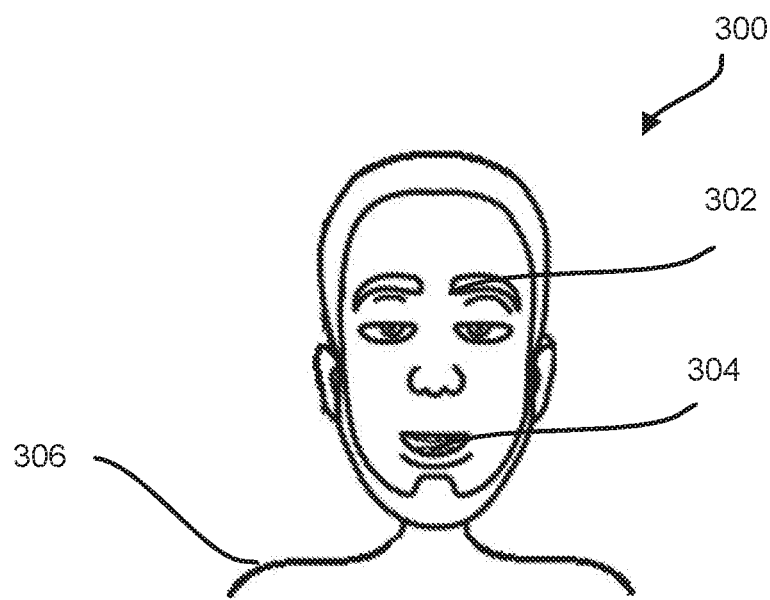
FIG. 3 shows a graphic of a virtual assistant as an animated character.

By way of non-limiting illustration, FIG. 3 shows a graphic of a virtual assistant provided as an animated character 300. The animated character 300 may be controlled to present a responsive communication. This may include timing movement of a mouth 304 with audio provided though a speaker. The animated character 300 may be configured to exhibit communicative behaviors of one or both of the verbal type and/or non-verbal type communication structures. For example, animated character 300 may include articulatable features. The features may include one or more of eyebrows 302, shoulders 306, and/or other features. These features may be controlled to utilize human communicative behaviors as presented herein to convey messages via one or both of a non-verbal type communication structure and/or verbal type communication structure. By way of non-limiting illustration, eyebrows 302 may be furled to convey confusion, shoulders 306 may be shrugged, and/or other behaviors may be simulated.

Returning to FIG. 1, computing platform 102, one or more other computing platforms 130, one or more sensors 128, and/or other components of system 100 may be operatively linked via one or more electronic communication links. For example, such electronic communication links may be established, at least in part, via one or more networks 126. The one or more networks 126 may include wired and/or wireless connections. By way of non-limiting illustration, one or more networks 126 may include one or more of the Internet, wireless Bluetooth Low Energy (BLE), wired Universal Serial Bus (USB) connection, and/or other connections. It will be appreciated that this is not intended to be limiting and that the scope of this disclosure includes implementations in which components of system 100 may be operatively linked via some other communication media.

The external resource(s) 132 may include sources of information, hosts, and/or providers of information outside of system 100, external entities participating with system 100, and/or other resources. In some implementations, some or all of the functionality attributed herein to external resource(s) 132 may be provided by resources included in system 100.

The computing platform 102 may include communication lines or ports to enable the exchange of information with one or more networks 126. Illustration of computing platform 102 in FIG. 1 is not intended to be limiting. The computing platform 102 may include a plurality of hardware, software, and/or firmware components operating together to provide the functionality attributed herein to computing platform 102. For example, computing platform 102 may be implemented by one or more of a server, a cloud of computing platforms operating together as computing platform 102, and/or other hardware, software, and/or firmware components.

Electronic storage 118 may include electronic storage media that electronically stores information. The electronic storage media of electronic storage 118 may include one or both of system storage that is provided integrally (i.e., substantially non-removable) with computing platform 102 and/or removable storage that is removably connectable to computing platform 102 via, for example, a port or a drive. A port may include a USB port, a firewire port, and/or other port. A drive may include a disk drive and/or other drive. Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 118 may include one or more virtual storage resources (e.g., cloud storage, a virtual private network, and/or other virtual storage resources). Electronic storage 118 may store software algorithms, information determined by processor(s) 104, information received from computing platform(s) 122, and/or other information that enables system 100 to function as described herein.

Processor(s) 104 may be configured to provide information-processing capabilities in computing platform 102. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor(s) 104 may be configured to execute components 108-114. Processor(s) 104 may be configured to execute components 108-114 by software; hardware; firmware; some combination of software, hardware, and/or firmware; and/or other mechanisms for configuring processing capabilities on processor(s) 104.

It should be appreciated that although components 108-114 are illustrated in FIG. 1 as being co-located within a single processing unit, in implementations in which processor(s) 104 includes multiple processing units, one or more of components 108-114 may be located remotely from the other components. While computer program components are described herein as being implemented via processor(s) 104 through machine readable instructions 106, this is merely for ease of reference and is not meant to be limiting. In some implementations, one or more functions of computer program components described herein may be implemented via hardware (e.g., dedicated chip, field-programmable gate array). One or more functions of computer program components described herein may be one or more of software-implemented, hardware-implemented, and/or software and hardware-implemented. The description of the functionality provided by the different components 108-114 described above is for illustrative purposes and is not intended to be limiting, as any of components 108-114 may provide more or less functionality than is described. For example, one or more of components 108-114 may be eliminated, and some or all of its functionality may be provided by other ones of components 108-114 and/or other components. As another example, processor(s) 104 may be configured to execute one or more additional components that may perform some or all of the functionality attributed to one of components 108-114.

Figure 2:
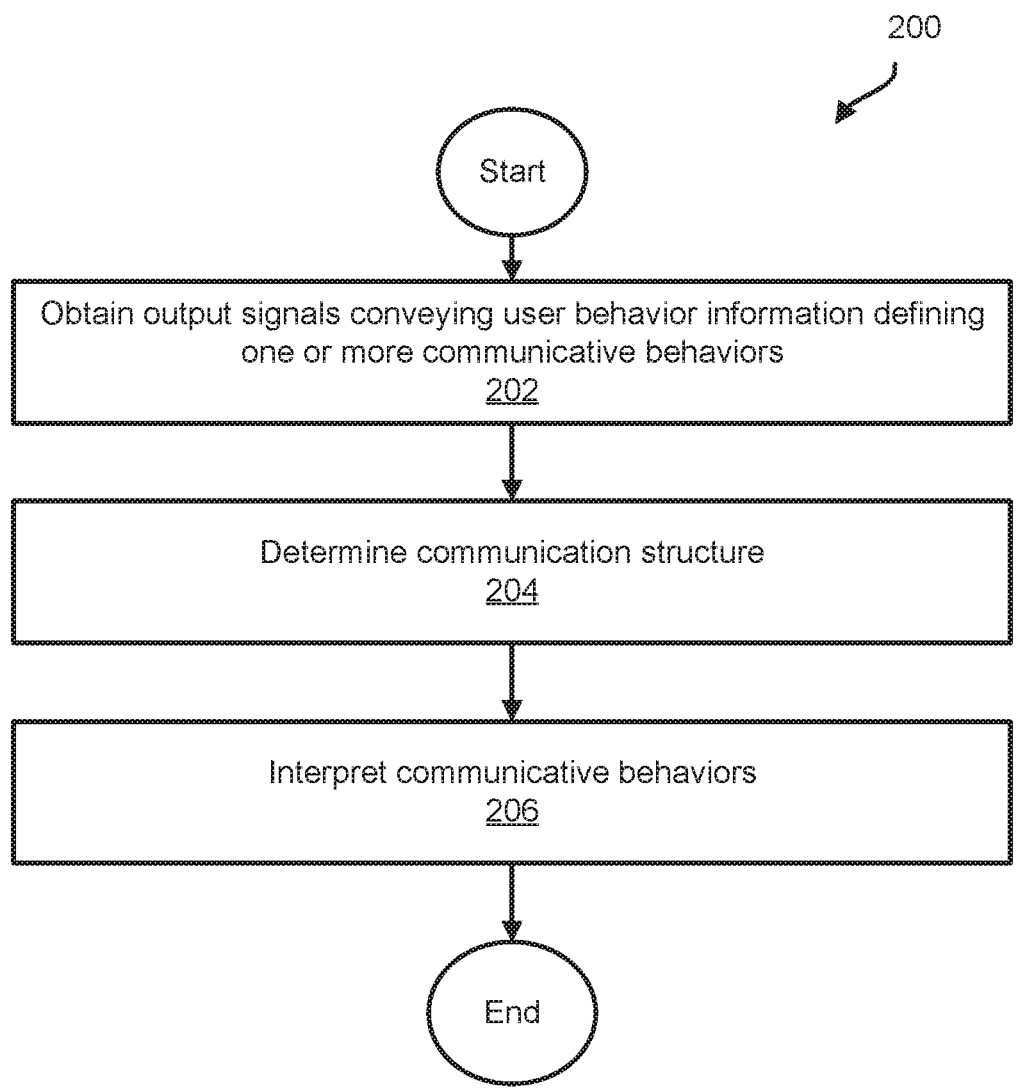
FIG. 2 illustrates a method to facilitate bi-directional artificial intelligence communication, in accordance with one or more implementations.

FIG. 2 illustrates a method 200 to facilitate artificial intelligence (AI) communications, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in a computer system comprising one or more processing devices (e.g., a digital processor, an analog processor, a digital circuit designed to process information, an analog circuit designed to process information, a state machine, and/or other mechanisms for electronically processing information), storage media storing machine-readable instructions, and/or other components. The one or more processing devices may include one or more devices executing some or all of the operations of method 200 in response to instructions stored electronically on electronic storage media. The one or more processing devices may include one or more devices configured through hardware, firmware, and/or software to be specifically designed for execution of one or more of the operations of method 200.

At an operation 202, output signals from one or more sensors may be obtained. The output signals may convey user behavior information and/or other information. The user behavior information may define one or more communicative behaviors of a user in a real world. In some implementations, operation 202 may be performed by one or more physical processors executing an input component the same as or similar to input component 108 (shown in FIG. 1 and described herein).

At an operation 204, individual communication structures of individual ones of the one or more communicative behaviors may be determined. The individual communication structures may be of an individual structure type. The structure types may include one or more of a verbal type communication structure, a non-verbal type communication structure, and/or other types. In some implementations, operation 204 may be performed by one or more physical processors executing a communication component the same as or similar to communication component 110 (shown in FIG. 1 and described herein).

At an operation 206, the one or more communicative behaviors may be interpreted based on the individual communication structures of the one or more communicative behaviors to determine a meaning of a message conveyed by the one or more communicative behaviors. In some implementations, operation 206 may be performed by one or more physical processors executing an interpretation component the same as or similar to interpretation component 112 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate artificial intelligence (AI) communications, the system comprising:
one or more physical processors configured by machine-readable instructions to:
obtain output signals from one or more sensors, the output signals conveying user behavior information, the user behavior information representing one or more communicative behaviors of a user in a real world;
determine individual communication structures of individual ones of the one or more communicative behaviors, the individual communication structures being an individual structure type that includes a verbal type communication structure or a non-verbal type communication structure;

interpret the one or more communicative behaviors based on the individual communication structures to determine a meaning of a message conveyed by the one or more communicative behaviors; and obtain association information, the association information specifying associations between individual communicative behaviors and individual meanings of messages and associations between combinations of communicative behaviors and individual meanings of messages, the association information including:

an association between a communicative behavior of the verbal type communication structure and a first meaning; and an association between a combination including a communicative behavior of the non-verbal type communication structure and the communicative behavior of the verbal type communication structure and a second meaning.

2. The system of claim 1, wherein the association information further includes:

an association between a combination of communicative behaviors of the verbal type communication structure and a third meaning;

an association between the communicative behavior of the non-verbal type communication structure and a fourth meaning; and an association between a combination of communicative behaviors of the non-verbal type communication structure and a fifth meaning.

3. The system of claim 2, wherein interpreting the one or more communicative behaviors based on the communication structures of the communicative behaviors to determine the meaning of the message conveyed by the one or more communicative behaviors is based on the association information.

4. The system of claim 3, wherein the one or more physical processors are further configured by the machine-readable instructions to:

determine the meaning of the message conveyed by the one or more communicative behaviors is the first meaning by virtue of determining the one or more communicative behaviors is the communicative behavior of the verbal type communication structure;

determine the meaning of the message conveyed by the one or more communicative behaviors is the second meaning by virtue of determining the one or more communicative behaviors is the combination including the communicative behavior of the non-verbal type communication structure;

determine the meaning of the message conveyed by the one or more communicative behaviors is the third meaning by virtue of determining the one or more communicative behaviors is the combination of communicative behaviors of the verbal type communication structure;

determine the meaning of the message conveyed by the one or more communicative behaviors is the fourth meaning by virtue of determining the one or more communicative behaviors is the communicative behavior of the non-verbal type communication structure; and determine the meaning of the message conveyed by the one or more communicative behaviors is the fifth meaning by virtue of determining the one or more communicative behaviors is the combination of communicative behaviors of the non-verbal type communication structure.

5. The system of claim 1, wherein the one or more physical processors are further configured by the machine-readable instructions to identify the individual ones of the one or more communicative behaviors as a communication of a sound, a communication of a movement, a communication of a biological marker, or a combination thereof.

6. The system of claim 5, wherein:

the individual communication structures are determined as a tone, a gesture, a physiological response, or a combination thereof;

the tone is one or both of the verbal type communication structure or the non-verbal type communication structure;

the gesture is one or both of the verbal type communication structure or the non-verbal type communication structure; and the physiological response is of the non-verbal type communication structure.

7. The system of claim 6, wherein:

the communication of the sound is determined as one or both of the tone of the verbal type communication structure or the tone of the non-verbal type communication structure;

the communication of the movement is determined as one or both of the gesture of the verbal type communication structure or the gesture of the non-verbal type communication structure; and the communication of the biological marker is determined as the physiological response of the non-verbal type communication structure.

8. The system of claim 1, wherein the user behavior information includes visual information, audio information, biometric information, or a combination thereof, the visual information defining visual content including one or more depictions of a user, the audio information defining audio content including one or more utterances from the user, and the biometric information including one or more biometric readings of the user.

9. The system of claim 1, wherein the one or more physical processors are further configured by the machine-readable instructions to:

determine a responsive communication that is responsive to the meaning of the message conveyed by the one or more communicative behaviors.

10. The system of claim 9, wherein the one or more physical processors are further configured by the machine-readable instructions to:

control an AI assistant to effectuate communication of the responsive communication.

11. The system of claim 1, wherein the association information further includes one or more of:

an association between a combination of communicative behaviors of the verbal type communication structure and a third meaning;

an association between the communicative behavior of the non-verbal type communication structure and a fourth meaning; or an association between a combination of communicative behaviors of the non-verbal type communication structure and a fifth meaning.

12. The method of claim 1, wherein the association information further includes one or more of:

an association between a combination of communicative behaviors of the verbal type communication structure and a third meaning;

an association between the communicative behavior of the non-verbal type communication structure and a fourth meaning; or an association between a combination of communicative behaviors of the non-verbal type communication structure and a fifth meaning.

13. A method to facilitate artificial intelligence (AI) communications, the method comprising:

obtaining output signals from one or more sensors, the output signals conveying user behavior information, the user behavior information representing one or more communicative behaviors of a user in a real world;

determining individual communication structures of individual ones of the one or more communicative behaviors, the individual communication structures being an individual structure type that includes a verbal type communication structure or a non-verbal type communication structure;

interpreting the one or more communicative behaviors based on the individual communication structures of the one or more communicative behaviors to determine a meaning of a message conveyed by the one or more communicative behaviors; and obtaining association information, the association information specifying associations between individual communicative behaviors and individual meanings of messages and associations between combinations of communicative behaviors and individual meanings of messages, the association information including:

an association between a communicative behavior of the verbal type communication structure and a first meaning; and an association between a combination including a communicative behavior of the non-verbal type communication structure and the communicative behavior of the verbal type communication structure and a second meaning.

14. The method of claim 13, wherein the association information further includes:

an association between a combination of communicative behaviors of the verbal type communication structure and a third meaning;

an association between the communicative behavior of the non-verbal type communication structure and a fourth meaning;

an association between a combination of communicative behaviors of the non-verbal type communication structure and a fifth meaning.

15. The method of claim 14, wherein interpreting the one or more communicative behaviors based on the communication structures of the communicative behaviors to determine the meaning of the message conveyed by the one or more communicative behaviors is based on the association information.

16. The method of claim 15, further comprising:

determining the meaning of the message conveyed by the one or more communicative behaviors is the first meaning by virtue of determining the one or more communicative behaviors is the communicative behavior of the verbal type communication structure;

determining the meaning of the message conveyed by the one or more communicative behaviors is the second meaning by virtue of determining the one or more communicative behaviors is the combination including the communicative behavior of the non-verbal type communication structure and the communicative behavior of the verbal type communication structure;

determining the meaning of the message conveyed by the one or more communicative behaviors is the third meaning by virtue of determining the one or more communicative behaviors is the combination of communicative behaviors of the verbal type communication structure;

determining the meaning of the message conveyed by the one or more communicative behaviors is the fourth meaning by virtue of determining the one or more communicative behaviors is the communicative behavior of the non-verbal type communication structure; and determining the meaning of the message conveyed by the one or more communicative behaviors is the fifth meaning by virtue of determining the one or more communicative behaviors is the combination of communicative behaviors of the non-verbal type communication structure.

17. The method of claim 13, further comprising:

identifying the individual ones of the one or more communicative behaviors as a communication of a sound, a communication of a movement, a communication of a biological marker, or a combination thereof.

18. The method of claim 17, wherein:

the individual communication structures are determined as a tone, a gesture, a physiological response, or a combination thereof;

the tone is one or both of the verbal type communication structure or the non-verbal type communication structure;

the gesture is one or both of the verbal type communication structure or the non-verbal type communication structure; and the physiological response is of the non-verbal type communication structure.

19. The method of claim 18, wherein:

the communication of the sound is determined as one or both of the tone of the verbal type communication structure or the tone of the non-verbal type communication structure;

the communication of the movement is determined as one or both of the gesture of the verbal type communication structure or the gesture of the non-verbal type communication structure; and the communication of the biological marker is determined as the physiological response of the non-verbal type communication structure.

20. The method of claim 13, wherein the user behavior information includes visual information, audio information, biometric information, or a combination thereof the visual information defining visual content including one or more depictions of a user, the audio information defining audio content including one or more utterances from the user, and the biometric information including one or more biometric readings of the user.

21. The method of claim 13, further comprising:

determining a responsive communication that is responsive to the meaning of the message conveyed by the one or more communicative behaviors.

22. The method of claim 21, further comprising:

controlling an AI assistant to effectuate communication of the responsive communication.

* * * * *